United States Patent
Zhang et al.

(10) Patent No.: US 11,861,668 B2
(45) Date of Patent: Jan. 2, 2024

(54) METHOD, DEVICE, ELECTRONIC APPARATUS AND STORAGE MEDIUM FOR GENERATING ORDER

(71) Applicant: AInnovation (Shanghai) Technology Co., Ltd., Shanghai (CN)

(72) Inventors: Faen Zhang, Shanghai (CN); Ju Wang, Shanghai (CN); Zhengyuan Ke, Shanghai (CN); Hui Xu, Shanghai (CN)

(73) Assignee: AInnovation (Shanghai) Technology Co., Ltd., Shanghai (CN)

( * ) Notice: Subject to any disclaimer, the term of this patent is extended or adjusted under 35 U.S.C. 154(b) by 691 days.

(21) Appl. No.: 16/874,951

(22) Filed: May 15, 2020

(65) Prior Publication Data

US 2021/0272170 A1 Sep. 2, 2021

(30) Foreign Application Priority Data

Feb. 27, 2020 (CN) .......................... 202010127461.0

(51) Int. Cl.
*G06Q 30/00* (2023.01)
*G06Q 30/0601* (2023.01)
(Continued)

(52) U.S. Cl.
CPC ....... *G06Q 30/0601* (2013.01); *G06F 18/217* (2023.01); *G06Q 10/087* (2013.01);
(Continued)

(58) Field of Classification Search
CPC .. G06Q 30/0601; G06Q 10/087; G06V 10/56; G06V 2201/07; G06K 9/6262
(Continued)

(56) References Cited

U.S. PATENT DOCUMENTS 9,505,554 B1 * 11/2016 Kong ..................... G06V 10/25
10,789,720 B1 * 9/2020 Mirza ..................... H04N 5/247
(Continued)

FOREIGN PATENT DOCUMENTS

CN 102479321 B 10/2016
CN 109711238 A 5/2019
(Continued)

OTHER PUBLICATIONS

"Bonney Lake Walmart's robot zips along in tech revolution that's raising big questions for workers," Hellmann, Melissa. The Seattle Times [Seattle, Wash] May 6, 2019; Dialog #2220866671, 3pgs. (Year: 2019).*
(Continued)

*Primary Examiner* — Robert M Pond
(74) *Attorney, Agent, or Firm* — Ziegler IP Law Group, LLC

(57) ABSTRACT

A method for generating an order includes acquiring by one or more processors, an initial image and a first detection result of a target container before being subjected to a pick-up operation, where the first detection result includes a first detection image with a number of first commodity frames obtained by processing the initial image, and first identification information corresponding to a commodity in each of the first commodity frames, acquiring by one or more processors, a result image of the target container after performing the pick-up operation, generating by one or more processors, an RGB difference image between before-shopping and after-shopping, based on the result image and the initial image, where the RGB difference image is obtained by calculating an absolute value of differences of individual pixels of the initial image and the result image before and after shopping in three RGB channels.

11 Claims, 6 Drawing Sheets

(51) Int. Cl.
  *G06Q 10/087* (2023.01)
  *G06V 10/56* (2022.01)
  *G06F 18/21* (2023.01)
  *G06V 20/10* (2022.01)

(52) U.S. Cl.
  CPC .............. *G06V 10/56* (2022.01); *G06V 20/10* (2022.01); *G06V 2201/07* (2022.01)

(58) Field of Classification Search
  USPC ..................................................... 705/26, 27
  See application file for complete search history.

(56) References Cited

U.S. PATENT DOCUMENTS

| | | | |
|---|---|---|---|
| 11,341,740 B2* | 5/2022 | Liu | G06T 7/337 |
| 2009/0226099 A1* | 9/2009 | Kundu | G06Q 20/4016 |
| | | | 382/224 |
| 2011/0320322 A1* | 12/2011 | Roslak | G06Q 10/087 |
| | | | 705/28 |
| 2015/0039458 A1* | 2/2015 | Reid | A61B 5/117 |
| | | | 705/26.1 |
| 2018/0232796 A1* | 8/2018 | Glaser | G06Q 40/12 |
| 2019/0043003 A1* | 2/2019 | Fisher | G06V 10/82 |
| 2021/0334533 A1* | 10/2021 | Liu | G06T 7/254 |

FOREIGN PATENT DOCUMENTS

| | | |
|---|---|---|
| CN | 109740459 A | 5/2019 |
| CN | 110378761 A | 10/2019 |
| CN | 110826481 A | 2/2020 |
| CN | 109033985 B | 10/2020 |
| CN | 109903265 B | 5/2021 |
| JP | 2015148955 A | 8/2015 |
| JP | 2016532932 A | 10/2016 |
| JP | 2019079322 A | 5/2019 |
| WO | 2014209724 A1 | 12/2014 |

OTHER PUBLICATIONS

"Is this the beginning of the end for the checkout? . . . " Nott, George. Grocer: 28. NLA Access Media Limited. (Jan. 18, 2020); Dialog #611648139, 4pgs. (Year: 2020).*

Japan Patent Office, Decsion to Grant a Patent, Application No. 2020-085622, dated Jun. 14, 2021, 3 pages. English Translation, 2 pages.

Japan Patent Office, Notice of Reasons for Refusal, Application No. 2020-085622, dated Jun. 1, 2022, 4 pages, English Translation, 2 pages.

The State Intellectual Property Office of People's Republic of China, Application No. 202010127461.0, dated Jul. 1, 2022, 5 pages, English Translation 7 pages.

The State Intellectual Property Office of People's Republic of China, Search Report, Application 2020101274610, dated Jul. 1, 2022, 2 pages.

* cited by examiner screening out a first target commodity frame having an RGB difference smaller than the first preset value from all of the first commodity frames in the first detection image based on the RGB difference image, and acquiring corresponding first identification information —S1041 generating a commodity order corresponding to the removed commodity based on the first target commodity frame and the corresponding first identification information. For the setting of the first preset value, brightness variations caused by imaging errors of the camera or the like shall be taken into account. The commodity within the first target commodity frame is removed by a buyer, thus, the commodity within the first target commodity frame is added to the commodity order for price calculation —S1042

FIG. 7 acquiring an initial image of a target container before the occurrence of a pick-up operation —S2011 performing detection processing on the initial image, so as to obtain a first detection image with a plurality of first commodity frames, wherein each of the first commodity frames contains one piece of commodity —S2012 performing recognition processing on the first detection image, so as to acquire first identification information of the commodity in each of the first commodity frames in the first detection image —S2013

FIG. 8

METHOD, DEVICE, ELECTRONIC APPARATUS AND STORAGE MEDIUM FOR GENERATING ORDER

CROSS-REFERENCE TO RELATED APPLICATIONS

The present disclosure claims the benefit of and priority to Chinese Patent Application No. 2020101274610, entitled "Method, Device, Electronic Apparatus and Storage Medium for Generating Order", filed with the Chinese Patent Office on Feb. 27, 2020, the disclosure of of which is incorporated herein by reference.

TECHNICAL FIELD

The present disclosure relates to the field of computer network technology, and particularly to a method, a device, an electronic apparatus, and a storage medium for generating an order.

BACKGROUND

In the traditional automated settlement algorithm for smart containers, recognition processing of detection and classification is performed on image information collected from a smart container generally by using deep neural networks, hereby obtaining kinds and quantities of commodities in current container. Then, the kinds and quantities are compared with the kinds and quantities of commodities recognized in the previous order image, hereby obtaining commodities taken by customers and realizing the function of automated settlement. However, the validity of the automated settlement result of the final order depends on the validity of the detection and the classification of all commodities in the order image and in the previous order image thereof, and there is no sufficient tolerance for detection problems and classification problems, resulting in a relatively low accuracy.

Directed at problems mentioned above, there is currently no effective technical solution yet.

SUMMARY

In a first aspect, an embodiment of the present disclosure provides a method for generating an order, comprising the following steps of:
acquiring an initial image and a first detection result of a target container before the occurrence of a pick-up operation, wherein the first detection result includes a first detection image with a plurality of first commodity frames obtained by processing the initial image, and first identification information corresponding to the commodity in each of the first commodity frames;
acquiring a result image of the target container after the finish of the pick-up operation;
generating an RGB difference image between before-shopping and after-shopping based on the result image and the initial image; and
generating a commodity order corresponding to the removed commodity based on the RGB difference image and the first detection result.

In a second aspect, an embodiment of the present disclosure provides a device for generating an order, comprising:
a first acquisition module, configured to acquire an initial image and a first detection result of a target container before the occurrence of a pick-up operation, wherein the first detection result includes a first detection image with a plurality of first commodity frames obtained by processing the initial image, and first identification information corresponding to the commodity in each of the first commodity frames;
a second acquisition module, configured to acquire a result image of the target container after the finish of the pick-up operation;
a first generation module, configured to generate an RGB difference image between before-shopping and after-shopping based on the result image and the initial image; and
a second generation module, configured to generate a commodity order corresponding to the removed commodity based on the RGB difference image and the first detection result.

In a third aspect, an embodiment of the present disclosure provides an electronic apparatus, comprising a processor and a memory, wherein the memory stores therein a computer readable instruction, wherein the steps in the method provided in the above first aspect are carried out, when the computer readable instruction is executed by the processor.

BRIEF DESCRIPTION OF THE DRAWINGS

In order to more clearly describe the technical solutions of the embodiments of the present disclosure, the drawings required to be used in the embodiments of the present disclosure will be simply presented below; and it shall be understood that the following drawings merely show certain embodiments of the present disclosure, and thus should not be deemed as limiting the scope thereof, and for a person ordinarily skilled in the art, further relevant drawings could be obtained according to these drawings without inventive efforts.

FIG. 7 is a flow chart of sub-steps of step S104 of the present disclosure;

FIG. 8 is a flow chart of sub-steps of step S201 of the present disclosure; and

DETAILED DESCRIPTION OF THE EMBODIMENTS

Figure 1:
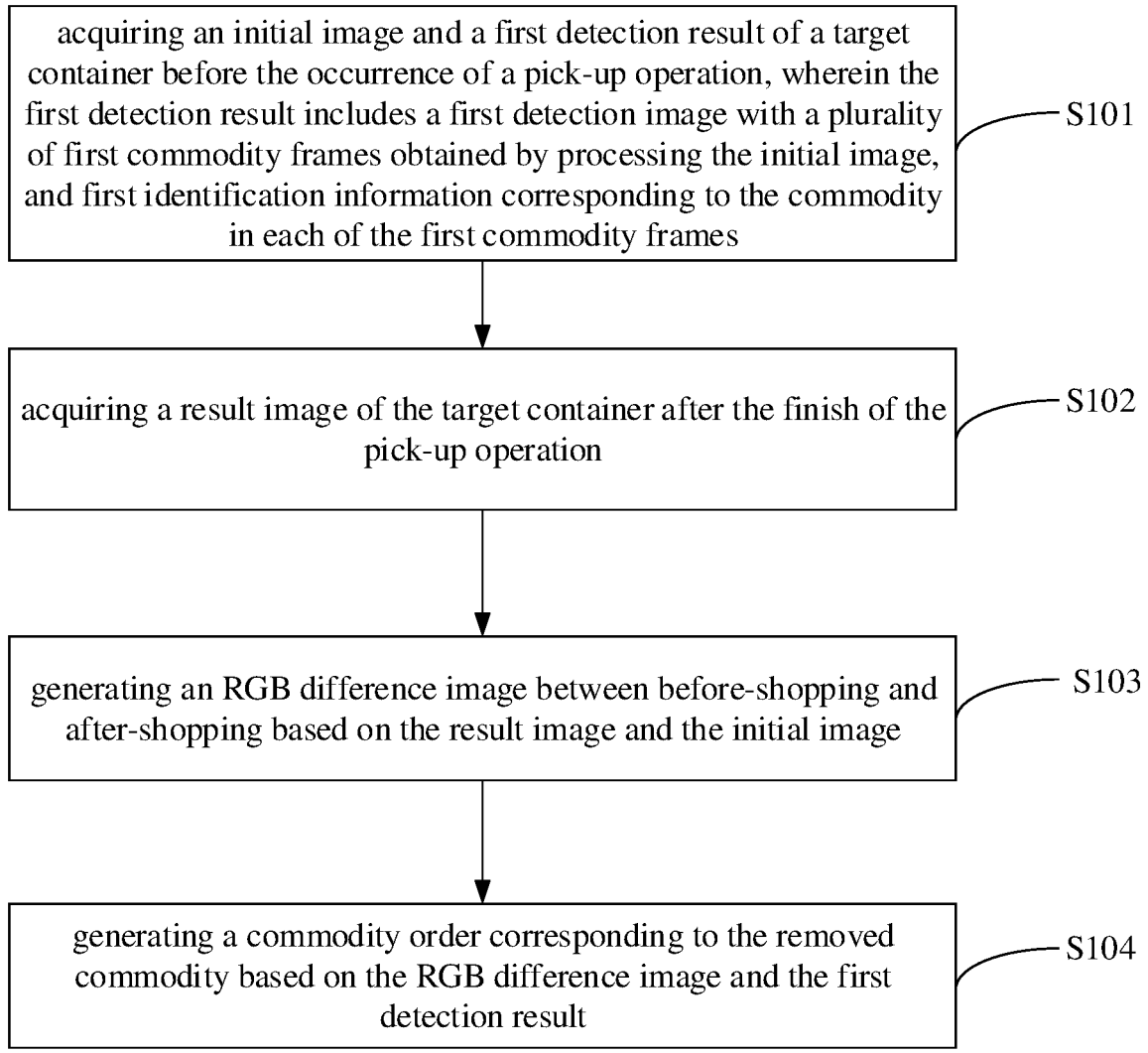
FIG. 1 is a flow chart of a method for generating an order provided in an embodiment of the present disclosure.

The technical solutions in the embodiments of the present disclosure will be clearly and comprehensively described below with reference to the drawings in the embodiments of the present disclosure. Obviously, the described embodiments are merely some of the embodiments of the present disclosure, but not all the embodiments. Generally, the assemblies of the embodiments of the present disclosure that are described and shown in the drawings herein may be arranged and designed according to various configurations. Thus, the following detailed description of the embodiments of the present disclosure that are provided in the drawings merely represents selected embodiments of the present disclosure, rather than being intended to limit the scope of the present disclosure claimed. Any other embodiments, obtained by a person skilled in the art without inventive efforts based on the embodiments in the present disclosure, shall fall within the scope of protection of the present disclosure.

It shall be noted that similar reference signs and letters represent similar items in the following drawings, thus, once a certain item is defined in one figure, no further definition and explanation of this item is necessary in the subsequent figures. Moreover, in the description of the present disclosure, terms such as "first" and "second" are used merely for purpose of differentiated description, and cannot be construed as indicating or implying to have importance in relativity.

An object of the embodiments of the present disclosure is to provide a method, a device, an electronic apparatus, and a storage medium for generating an order, through which the accuracy rate of order generation can be improved.

In a first aspect, an embodiment of the present disclosure provides a method for generating an order, comprising the following steps of:

acquiring an initial image and a first detection result of a target container before the occurrence of a pick-up operation, wherein the first detection result includes a first detection image with a plurality of first commodity frames obtained by processing the initial image, and first identification information corresponding to the commodity in each of the first commodity frames;

acquiring a result image of the target container after the finish of the pick-up operation;

generating an RGB difference image between before-shopping and after-shopping based on the result image and the initial image; and generating a commodity order corresponding to the removed commodity based on the RGB difference image and the first detection result.

In the embodiment of the present disclosure, the RGB difference image generated based on images before and after picking up is utilized to determine whether individual commodities are removed or not, hereby generating a corresponding commodity order, which the accuracy rate of orders can be improved.

Optionally, in the method for generating an order according to an embodiment of the present disclosure, the step of generating a commodity order corresponding to the removed commodity based on the RGB difference image and the first detection result comprises:

screening out a first target commodity frame having an RGB difference smaller than a first preset value from all of the first commodity frames in the first detection image based on the RGB difference image, and acquiring corresponding first identification information; and generating a commodity order corresponding to the removed commodity based on the first target commodity frame and the corresponding first identification information.

Optionally, in the method for generating an order according to an embodiment of the present disclosure, after the step of acquiring a result image of the target container after the finish of the pick-up operation, the method further comprises the following step of:

performing detection processing on the result image, so as to obtain a second detection result, wherein the second detection result includes a second detection image with a plurality of second commodity frames obtained by processing the result image, and second identification information corresponding to the commodity in each of the second commodity frames; and the step of generating a commodity order corresponding to the removed commodity based on the RGB difference image and the first detection result comprises:

screening out a first target commodity frame having an RGB difference smaller than the first preset value from all of the first commodity frames in the first detection image based on the RGB difference image, and acquiring corresponding first identification information;

screening out a second target commodity frame having an RGB difference smaller than the first preset value from all of the second commodity frames in the second detection image based on the RGB difference image, and acquiring corresponding second identification information; and generating a commodity order corresponding to the removed commodity based on the first target commodity frame, the first identification information, the second target commodity frame, and the second identification information.

In the embodiment of the present disclosure, a commodity order is computed by firstly respectively filtering the first detection image and the second detection image with the RGB difference image and then combining the results of the both, which can avoid that the position change of a commodity causes a misjudgment whether the commodity is removed or not, hereby improving the accuracy of the order.

Optionally, in the method for generating an order according to an embodiment of the present disclosure, the step of detecting the result image so as to obtain a second detection result comprises:

performing detection processing on the result image, so as to obtain a second detection image with a plurality of second commodity frames, wherein each of the second commodity frames contains one piece of commodity;

performing filtration processing on the second detection image based on the RGB difference image, so as to delete, from the second detection image, the second commodity frames having an RGB difference smaller than the first preset value and corresponding commodities, hereby obtaining a second target detection image; and performing recognition processing on the second target detection image, so as to acquire second identification information in each of the second commodity frames in the target detection image.

In the embodiment of the present disclosure, during performing the detection processing on the result image, filtration is firstly performed, and then recognition operation is carried out, thereby the computational efficiency can be improved, and the workload can be reduced.

Optionally, in the method for generating an order according to an embodiment of the present disclosure, the method further comprises the following step of:

storing the result image and the second detection result, and setting the result image and the second detection result as the initial image and the first detection result for next pick-up operation.

Optionally, in the method for generating an order according to an embodiment of the present disclosure, the step of acquiring an initial image and a first detection result of a target container before the occurrence of a pick-up operation comprises:

acquiring an initial image of a target container before the occurrence of the pick-up operation;

performing detection processing on the initial image, so as to obtain a first detection image with a plurality of first commodity frames, wherein each of the first commodity frames contains one piece of commodity; and performing recognition processing on the first detection image, so as to acquire first identification information of the commodity in each of the first commodity frames in the first detection image.

In a second aspect, an embodiment of the present disclosure provides a device for generating an order, comprising:

a first acquisition module, configured to acquire an initial image and a first detection result of a target container before the occurrence of a pick-up operation, wherein the first detection result includes a first detection image with a plurality of first commodity frames obtained by processing the initial image, and first identification information corresponding to the commodity in each of the first commodity frames;

a second acquisition module, configured to acquire a result image of the target container after the finish of the pick-up operation;

a first generation module, configured to generate an RGB difference image between before-shopping and after-shopping based on the result image and the initial image; and a second generation module, configured to generate a commodity order corresponding to the removed commodity based on the RGB difference image and the first detection result.

Optionally, in the device for generating an order according to an embodiment of the present disclosure, the second generation module includes:

a first acquisition unit, configured to screen out a first target commodity frame having an RGB difference smaller than a first preset value from all of the first commodity frames in the first detection image based on the RGB difference image, and to acquire corresponding first identification information; and a first generation unit, configured to generate a commodity order corresponding to the removed commodity based on the first target commodity frame and the corresponding first identification information.

In a third aspect, an embodiment of the present disclosure provides an electronic apparatus, comprising a processor and a memory, wherein the memory stores therein a computer readable instruction, wherein the steps in the method provided in the above first aspect are carried out, when the computer readable instruction is executed by the processor.

In a fourth aspect, an embodiment of the present disclosure provides a storage medium, in which a computer program is stored, wherein the steps in the method provided in the above first aspect are carried out, when the computer program is executed by the processor.

It can be seen from the foregoing that in the embodiments of the present disclosure, through the steps of acquiring an initial image and a first detection result of a target container before the occurrence of a pick-up operation, wherein the first detection result includes a first detection image with a plurality of first commodity frames obtained by processing the initial image, and first identification information corresponding to the commodity in each of the first commodity frames; acquiring a result image of the target container after the finish of the pick-up operation; generating an RGB difference image between before-shopping and after-shopping based on the result image and the initial image; and generating a commodity order corresponding to the removed commodity based on the RGB difference image and the first detection result, automatic generation of a commodity order is realized, wherein the error rate is reduced and the accuracy rate of detection is improved, since the RGB difference image is generated by using preceding and following images, and the judgment, whether a commodity is removed or not, is realized based on the difference image.

Other features and advantages of the present disclosure will be described in the subsequent description, and a part thereof becomes obvious from the description or would be understood by implementing the embodiments of the present disclosure. The objects and other advantages of the present disclosure will be realized and obtained through a structure specifically indicated in the written description, claims and drawings.

Referring to FIG. 1, FIG. 1 is a flow chart of a method for generating an order in some embodiments of the present disclosure. This method for generating an order is applied to an unmanned smart container. This method can be applied to an electronic apparatus such as a server or a terminal apparatus. This method for generating an order comprises the following steps of:

S101: acquiring an initial image and a first detection result of a target container before the occurrence of a pick-up operation, wherein the first detection result includes a first detection image with a plurality of first commodity frames obtained by processing the initial image, and first identification information corresponding to the commodity in each of the first commodity frames.

S102: acquiring a result image of the target container after the finish of the pick-up operation.

S103: generating an RGB difference image between before-shopping and after-shopping based on the result image and the initial image.

S104: generating a commodity order corresponding to the removed commodity based on the RGB difference image and the first detection result.

Here in step S101, a commodity cabin is arranged in this target container, and a plurality of commodities distributed with an interval therebetween are placed in this commodity cabin for buyers to select. This initial image is taken by a camera arranged on the top wall inside the target container, and the brightness in the target container remains constant. After that the initial image taken by the camera is acquired by an electronic apparatus, a preset model is adopted to process this initial image, hereby obtaining a detection result. Specifically, this initial image is divided into regions, that is to say, each commodity is assigned to one commodity frame, and then the commodity in each of the commodity frames is respectively recognized.

Specifically, in some embodiments, step S101 comprises the following steps of: S1011: acquiring an initial image of a target container before the occurrence of a pick-up operation; S1012: performing detection processing on the initial image, so as to obtain a first detection image with a plurality of first commodity frames, wherein each of the first commodity frames contains one piece of commodity; and S1013: performing recognition processing on the first detection image, so as to acquire first identification information of the commodity in each of the first commodity frames in the first detection image.

Here in step S1012, the operation of detection processing can be implemented by adopting a preset detection model, so as to realize the tagging of each commodity in this initial image with the first commodity frame. Each of the first commodity frames contains one piece of commodity. In step S1013, a preset recognition model or classification model can be adopted to recognize the commodity in each of the first commodity frames, so as to acquire the first identification information of this commodity.

In step S102, the final result image is taken by the camera inside the target container, after that a buyer completes the shopping and clicks the payment operation. In this result image, the commodity selected and removed by the user no longer exists.

In step S103, a diff image that can reflect the difference information between the previous and following images, i.e. an RGB difference image, can be obtained by calculating the absolute value of differences of individual pixels of the initial image and the result image before and after shopping in the three RGB channels. The diff information graph, i.e. the RGB difference image, reflects the variation of the images before and after the occurrence of the pick-up operation. If the average value of the variation of the RGB difference within a certain commodity frame is lower than the threshold value, it can be considered that no change occurs to the commodity within the commodity frame.

In step S104, the commodity within a commodity frame is considered to be removed, if the RGB difference of the commodity frame is relatively great, i.e. exceeds the first preset value, thus, a commodity order can be generated on the basis of the first identification information of the removed commodity.

Specifically, in some embodiments, step S104 comprises the following steps of: S1041: screening out a first target commodity frame having an RGB difference smaller than the first preset value from all of the first commodity frames in the first detection image based on the RGB difference image, and acquiring corresponding first identification information; and S1042: generating a commodity order corresponding to the removed commodity based on the first target commodity frame and the corresponding first identification information. For the setting of the first preset value, brightness variations caused by imaging errors of the camera or the like shall be taken into account. The commodity within the first target commodity frame is removed by a buyer, thus, the commodity within the first target commodity frame is added to the commodity order for price calculation.

It shall be understood that in some embodiments, this method for generating an order further comprises the following step of:

S105: storing the result image and the second detection result, and setting the result image and the second detection result as the initial image and the first detection result for next pick-up operation. During the occurrence of the next pick-up operation, this initial image and the first detection result are directly adopted for computation, which can improve the efficiency.

It can be seen from the foregoing that in the embodiments of the present disclosure, through the steps of acquiring an initial image and a first detection result of a target container before the occurrence of a pick-up operation, with the first detection result including a first detection image with a plurality of first commodity frames obtained by processing the initial image, and first identification information corresponding to the commodity in each of the first commodity frames; acquiring a result image of the target container after the finish of the pick-up operation; generating an RGB difference image between before-shopping and after-shopping based on the result image and the initial image; and generating a commodity order corresponding to the removed commodity based on the RGB difference image and the first detection result, automatic generation of a commodity order is realized, wherein the error rate is reduced and the accuracy rate of detection is improved, since the RGB difference image is generated by using preceding and following images, and the judgment, whether a commodity is removed or not, is realized based on the difference image.

Figure 2:
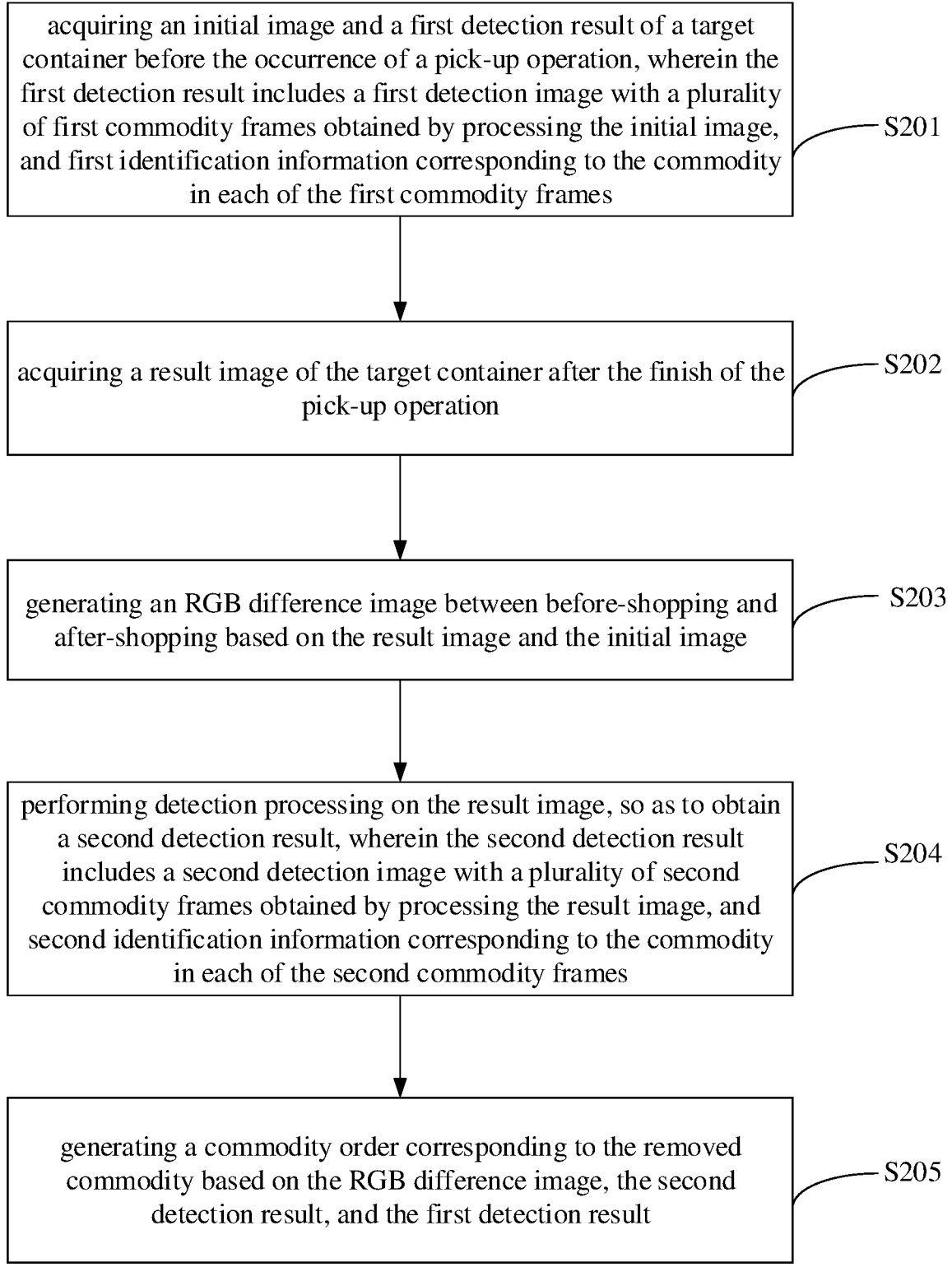
FIG. 2 is another flow chart of a method for generating an order provided in an embodiment of the present disclosure.

Referring to FIG. 2, FIG. 2 is a flow chart of a method for generating an order in some embodiments of the present disclosure. This method for generating an order is applied to an unmanned smart container. This method can be applied to an electronic apparatus such as a server or a terminal apparatus. This method for generating an order comprises the following steps of:

S201: acquiring an initial image and a first detection result of a target container before the occurrence of a pick-up operation, wherein the first detection result includes a first detection image with a plurality of first commodity frames obtained by processing the initial image, and first identification information corresponding to the commodity in each of the first commodity frames.

S202: acquiring a result image of the target container after the finish of the pick-up operation.

S203: generating an RGB difference image between before-shopping and after-shopping based on the result image and the initial image.

S204: performing detection processing on the result image, so as to obtain a second detection result, wherein the second detection result includes a second detection image with a plurality of second commodity frames obtained by processing the result image, and second identification information corresponding to the commodity in each of the second commodity frames.

S205: generating a commodity order corresponding to the removed commodity based on the RGB difference image, the second detection result, and the first detection result.

Here in step S201, a commodity cabin is arranged in this target container, and a plurality of commodities distributed with an interval therebetween are placed in this commodity cabin for buyers to select. This initial image is taken by a camera arranged on the top wall inside the target container, and the brightness in the target container remains constant. After that the initial image taken by the camera is acquired by an electronic apparatus, a preset model is adopted to process this initial image, hereby obtaining a detection result. Specifically, this initial image is divided into regions, that is to say, each commodity is assigned to one commodity frame, and then the commodity in each of the commodity frames is respectively recognized.

Specifically, in some embodiments, step S201 comprises the following steps of: S2011: acquiring an initial image of a target container before the occurrence of a pick-up operation; S2012: performing detection processing on the initial image, so as to obtain a first detection image with a plurality of first commodity frames, wherein each of the first commodity frames contains one piece of commodity; and S2013: performing recognition processing on the first detection image, so as to acquire first identification information of the commodity in each of the first commodity frames in the first detection image.

Here in step S2012, the operation of detection processing can be implemented by adopting a preset detection model, so as to realize the tagging of each commodity in this initial image with the first commodity frame. Each of the first commodity frames contains one piece of commodity. In step S2013, a preset recognition model or classification model can be adopted to recognize the commodity in each of the first commodity frames, so as to acquire the first identification information of this commodity.

In step S202, the final result image is taken by the camera inside the target container, after that a buyer completes the shopping and clicks the payment operation. In this result image, the commodity selected and removed by the user no longer exists.

In step S203, a diff information image that can reflect the difference information between the previous and following images, i.e. an RGB difference image, can be obtained by calculating the absolute value of differences of individual pixels of the initial image and the result image before and after shopping in the three RGB channels. The diff information graph, i.e. the RGB difference image, reflects a region, in which a change of the images before and after the occurrence of the pick-up operation occurs. If the RGB difference within a certain commodity frame is lower than the threshold value, it can be considered that no change occurs to the commodity within the commodity frame.

In step S204, detection processing is performed on this result image through a preset detection processing model, and accordingly, a second commodity frame is used to frame each commodity in this result image. The framed commodity is then recognized, hereby acquiring second identification information thereof.

Specifically, in some embodiments, step S204 comprises: S2041: performing detection processing on the result image, so as to obtain a second detection image with a plurality of second commodity frames, wherein each of the second commodity frames contains one piece of commodity; S2042: performing filtration processing on the second detection image based on the RGB difference image, so as to delete, from the second detection image, the second commodity frames having an RGB difference smaller than the first preset value and corresponding commodities, hereby obtaining a second target detection image; and S2043: performing recognition processing on the second target detection image, so as to acquire second identification information in each of the second commodity frames in the target detection image. Here in step S2042, the workload of subsequently proceeding a recognition processing operation can be lowered by deleting the second commodity frames having an RGB difference smaller than the first preset value and the corresponding commodities from the image, and the computation speed is accordingly improved. Here in step S2043, a preset recognition model or classification model is adopted to recognize the commodity in this second target detection image to obtain corresponding second identification information.

In step S205, the removed commodity can be accurately computed by combining the first target commodity frame and the corresponding first identification information obtained in step S203 and the second target commodity frame and the corresponding second identification information obtained in step S204. The removed commodity is accordingly added to the commodity order for price calculation, hereby generating a commodity order.

Since positional change of a commodity might occur when a buyer picks and places the commodity, regarding the first target commodity frame computed in step S203, there might be possibilities that the variation of the RGB difference in corresponding region of the first target commodity frame might be great only because of positional change, instead of being removed, out of this reason, the order is inaccurate, when the first target commodity of this region is deemed as removed commodity. Thus, a correcting step is added in the present embodiment, the commodity in each of the second commodity frames in the second target detection image obtained in step S204 is just the commodity whose position is changed, but which is not removed; then, this commodity whose position is changed, but which is not removed is deleted from the commodities in the first target commodity frame obtained in step S203, the commodity removed by the buyer is accordingly obtained, hereby improving the accuracy rate of detection and avoiding error in the commodity order.

In some embodiments, this method for generating an order further comprises the following step of:

S206: storing the result image and the second detection result, and setting the result image and the second detection result as the initial image and the first detection result for next pick-up operation. During the occurrence of the next pick-up operation, this initial image and the first detection result are directly adopted for computation, which can improve the efficiency.

Figure 3:
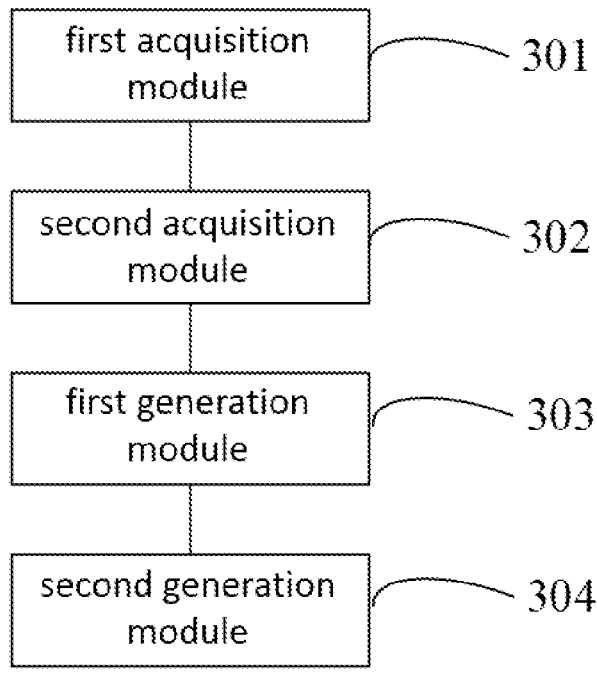
FIG. 3 is a structural schematic diagram of a device for generating an order provided in an embodiment of the present disclosure.

Referring to FIG. 3, FIG. 3 is a structural schematic diagram of a device for generating an order in some embodiments of the present disclosure. This device for generating an order comprises: a first acquisition module 301, a second acquisition module 302, a first generation module 303 and a second generation module 304.

Herein, the first acquisition module 301 is configured to acquire an initial image and a first detection result of a target container before the occurrence of a pick-up operation, wherein the first detection result includes a first detection image with a plurality of first commodity frames obtained by processing the initial image, and first identification information corresponding to the commodity in each of the first commodity frames. A commodity cabin is arranged in this target container, and a plurality of commodities distributed with an interval therebetween are placed in this commodity cabin for buyers to select. This initial image is taken by a camera arranged on the top wall inside the target container, and the brightness in the target container remains constant. After that the initial image taken by the camera is acquired by an electronic apparatus, a preset model is adopted to process this initial image, hereby obtaining a detection result. Specifically, this initial image is divided into regions, that is to say, each commodity is assigned to one commodity frame, and then the commodity in each of the commodity frames is respectively recognized.

Specifically, in some embodiments, this first acquisition module 301 is configured to: acquire an initial image of a target container before the occurrence of a pick-up operation; perform detection processing on the initial image, so as to obtain a first detection image with a plurality of first commodity frames, wherein each of the first commodity frames contains one piece of commodity; and perform recognition processing on the first detection image, so as to acquire first identification information of the commodity in each of the first commodity frames in the first detection image.

Here, the second acquisition module 302 is configured to acquire a result image of the target container after the finish of the pick-up operation. The final result image is taken by the camera inside the target container, after that a buyer completes the shopping and clicks the payment operation. In this result image, the commodity selected and removed by the user no longer exists.

Here, the first generation module 303 is configured to generate an RGB difference image between before-shopping and after-shopping based on the result image and the initial image. A diff information image that can reflect the difference information between the previous and following images, i.e. an RGB difference image, can be obtained by calculating the absolute value of differences of individual pixels of the initial image and the result image before and after shopping in the three RGB channels. The diff information graph, i.e. the RGB difference image, reflects the region, in which a change of the images before and after the occurrence of the pick-up operation occurs. If the RGB difference within a certain commodity frame is lower than the threshold value, it can be considered that no change occurs to the commodity within the commodity frame.

Here, the second generation module 304 is configured to generate a commodity order corresponding to the removed commodity based on the RGB difference image and the first detection result.

In some embodiments, this second generation module 304 includes: a first acquisition unit, configured to screen out a first target commodity frame having an RGB difference smaller than a first preset value from all of the first commodity frames in the first detection image based on the RGB difference image, and to acquire corresponding first identification information; and a first generation unit, configured to generate a commodity order corresponding to the removed commodity based on the first target commodity frame and the corresponding first identification information. For the setting of the first preset value, brightness variations caused by imaging errors of the camera or the like shall be taken into account. The commodity within the first target commodity frame is removed by a buyer, thus, the commodity within the first target commodity frame is added to the commodity order for price calculation.

Figure 4:
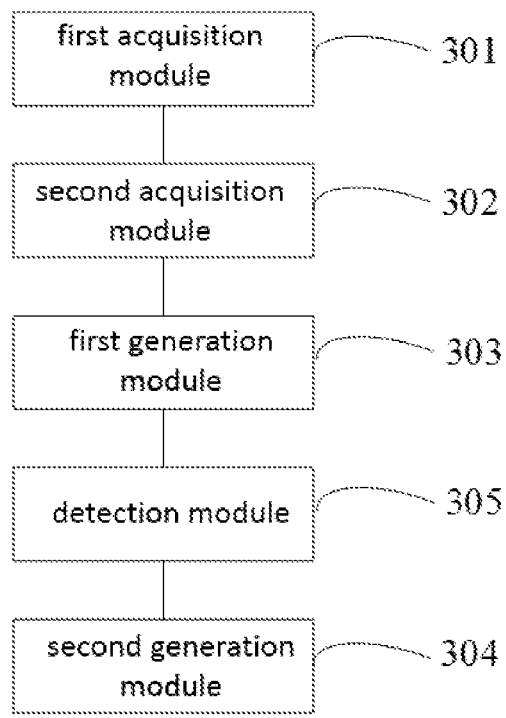
FIG. 4 is another structural schematic diagram of a device for generating an order provided in an embodiment of the present disclosure.

Referring to FIG. 4, in some embodiments, this device for generating an order further comprises a detection module 305, which is configured to perform detection processing on the result image, so as to obtain a second detection result, wherein the second detection result includes a second detection image with a plurality of second commodity frames obtained by processing the result image, and second identification information corresponding to the commodity in each of the second commodity frames. Correspondingly, in this embodiment, the second generation module 304 is configured to screen out a first target commodity frame having an RGB difference smaller than the first preset value from all of the first commodity frames in the first detection image based on the RGB difference image, and to acquire corresponding first identification information; and to screen out a second target commodity frame having an RGB difference smaller than the first preset value from all of the second commodity frames in the second detection image based on the RGB difference image, and to acquire corresponding second identification information; and to generate a commodity order corresponding to the removed commodity based on the first target commodity frame, the first identification information, the second target commodity frame, and the second identification information.

Figure 5:
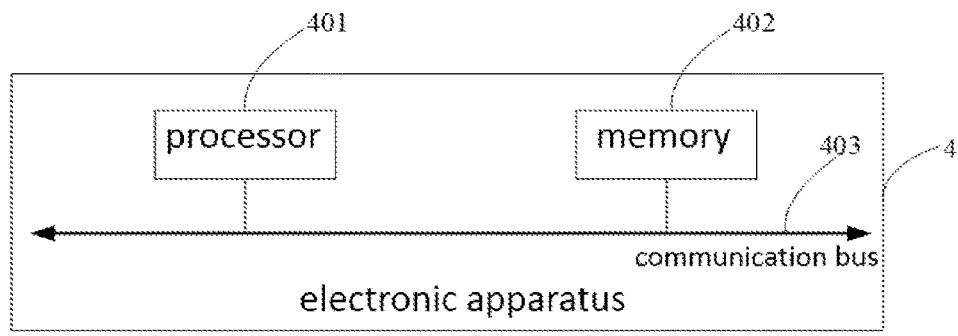
FIG. 5 is a structural schematic diagram of an electronic apparatus provided in an embodiment of the present disclosure.
Figure 6:
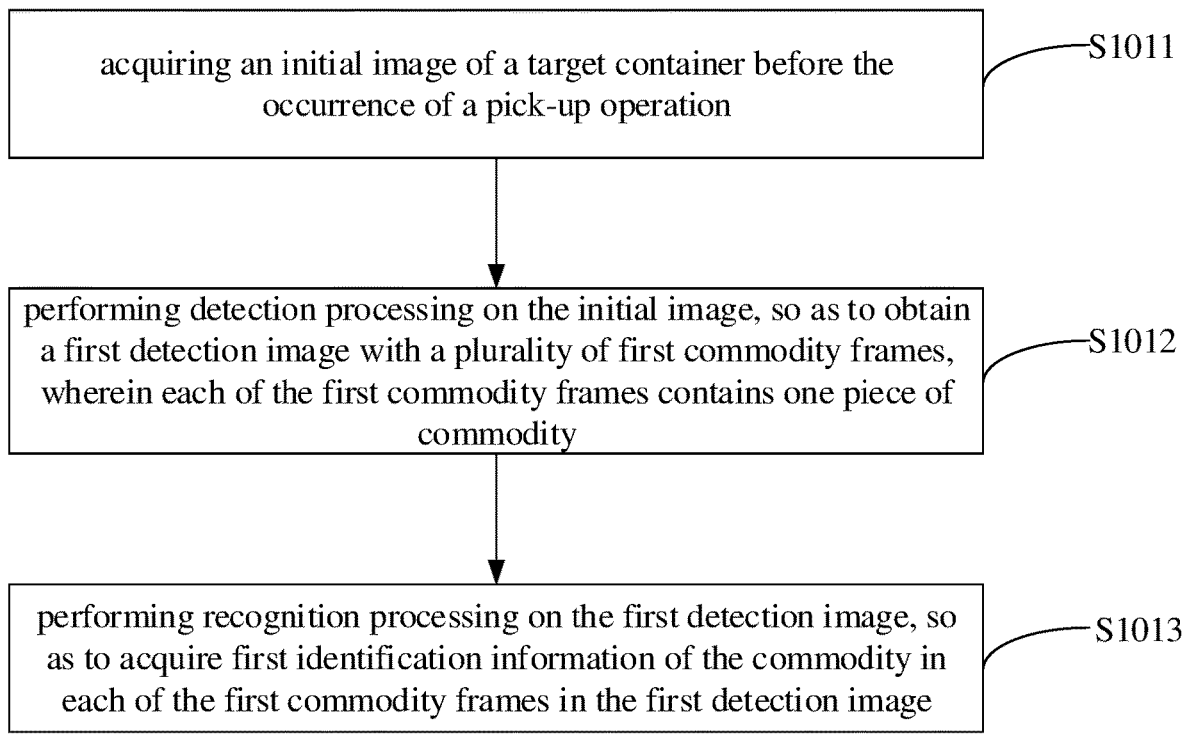
FIG. 6 is a flow chart of sub-steps of step S101 of the present disclosure.
Figure 9:
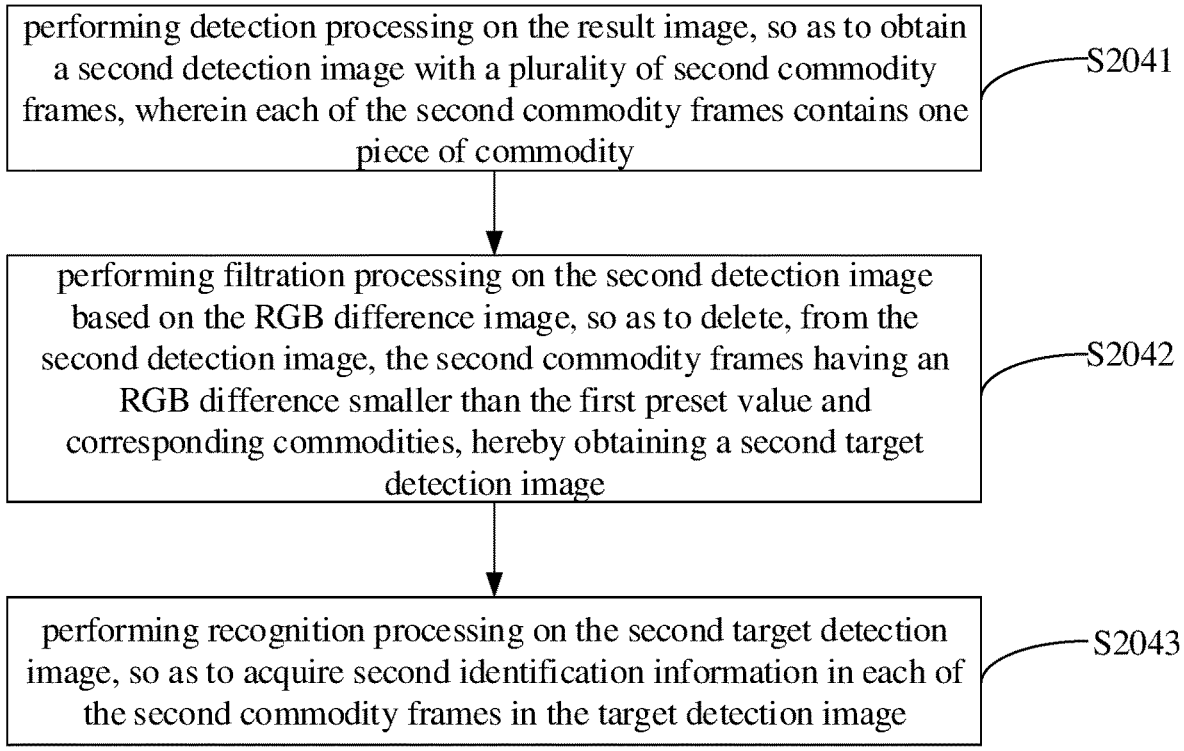
FIG. 9 is a flow chart of sub-steps of step S204 of the present disclosure.

Referring to FIG. 5, FIG. 5 is a structural schematic diagram of an electronic apparatus provided in an embodiment of the present disclosure, the present disclosure provides an electronic apparatus 4, comprising: a processor 401 and a memory 402, wherein the processor 401 and the memory 402 are in connection and in communication with each other via communication bus 403 and/or a connecting mechanisms of other forms (not marked), a computer program executable by the processor 401 is stored in the memory 402, and the processor 401 executes this computer program during the operation of a computing apparatus, so as to execute the method according to any optional implementation mode of the above embodiments.

In some embodiments, the individual functions of this electronic apparatus can be distributed in a series of different apparatuses. The detection processing operation and the recognition processing operation may respectively run in the two GPUs of a first apparatus and a second apparatus. Therefore, the system can perform parallel processing according to a corresponding signal flow, hereby increasing the order processing speed on the one hand, while making better use of idle computational resources on the other hand.

An embodiment of the present disclosure provides a storage medium, wherein the method according to any optional implementation mode of the above embodiments is executed, when the computer program is executed by the processor. Herein, the storage medium may be implemented by any type of volatile or non-volatile storage apparatuses or a combination thereof, e.g. SRAM (Static Random Access Memory), EEPROM (Electrically Erasable Programmable Read-Only Memory), EPROM (Erasable Programmable Read-Only Memory), PROM (Programmable Read-Only Memory), ROM (Read-Only Memory), magnetic memory, flash memory, magnetic disc or optical disc.

In the embodiments provided in the present disclosure, it shall be understood that the disclosed device and method may be implemented in other ways. The embodiments of device described above are merely schematic, for example, the unit division refers to merely a division of logical functions, and during practical implementation, it may be divided in other ways; for example, a plurality of units or assemblies may be combined or integrated into another system, or some features may be ignored or may not be implemented. Further, the displayed or discussed mutual coupling or direct coupling or communication connection may be indirect coupling or communication connection via certain communication interfaces, devices or units, and may be electrical, mechanical coupling or communication connection, or coupling or communication connection in other forms.

In addition, units described as separate components may be or may not be physically separate, components displayed as units may be or may not be physical units, i.e. may be placed at one location, or may be distributed on a plurality of network units. Partial or all units may be selected according to actual requirements to achieve the purpose of the solution of the present embodiment.

Moreover, individual functional modules in the individual embodiments of the present disclosure may be integrated together to form an independent part, or individual modules may exist separately, or two or more modules may be integrated to form an independent part.

In the context, relational terms such as first and second or the like are used only to distinguish one entity or operation from another entity or operation, and do not necessarily require or imply that there is any such practical relation or sequence among these entities or operations.

The above mentioned is merely embodiments of the present disclosure, and is not intended to limit the scope of protection of the present disclosure, and for a person skilled in the art, the present disclosure may be modified and changed in various ways. Any modifications, equivalent substitutions and improvements made within the spirit and the principle of the present disclosure shall all be covered in the scope of protection of the present disclosure.

The invention claimed is:

1. A method for generating an order, comprising:
   acquiring by one or more processors, an initial image and a first detection result of a target container before being subjected to a pick-up operation, wherein the first detection result comprises a first detection image with a plurality of first commodity frames obtained by processing the initial image, and first identification information corresponding to a commodity in each of the first commodity frames;
   acquiring by one or more processors, a result image of the target container after performing the pick-up operation;
   generating by one or more processors, an RGB difference image between before-shopping and after-shopping, based on the result image and the initial image, wherein the RGB difference image is obtained by calculating an absolute value of differences of individual pixels of the initial image and the result image before and after shopping in three RGB channels; and
   generating by one or more processors, a commodity order corresponding to a removed commodity based on the RGB difference image and the first detection result, wherein generating a commodity order corresponding to a removed commodity based on the RGB difference image and the first detection result comprises:
      screening out a first target commodity frame having an RGB difference smaller than a first preset value, from all of the first commodity frames in the first detection image, based on the RGB difference image, and acquiring first corresponding identification information; and
      generating the commodity order corresponding to the removed commodity based on the first target commodity frame and the first corresponding identification information;
   wherein after acquiring a result image of the target container after performing the pick-up operation, the method further comprises performing detection processing on the result image, so as to obtain a second detection result,
   wherein the second detection result comprises a second detection image with a plurality of second commodity frames obtained by processing the result image and second identification information corresponding to a commodity in each of the second commodity frames, and
   generating a commodity order corresponding to a removed commodity based on the RGB difference image and the first detection result comprises generating the commodity order corresponding to the removed commodity based on the RGB difference image, the second detection result, and the first detection result.

2. The method for generating an order according to claim 1, wherein the generating a commodity order corresponding to a removed commodity based on the RGB difference image, the second detection result, and the first detection result comprises:
   screening out a first target commodity frame having an RGB difference smaller than a first preset value, from all of the first commodity frames in the first detection image, based on the RGB difference image, and acquiring corresponding first identification information;
   screening out a second target commodity frame having an RGB difference smaller than the first preset value, from all of the second commodity frames in the second detection image, based on the RGB difference image, and acquiring corresponding second identification information; and
   generating the commodity order corresponding to the removed commodity based on the first target commodity frame, the first identification information, the second target commodity frame, and the second identification information.

3. The method for generating an order according to claim 1, wherein the detecting the result image so as to obtain a second detection result comprises:
   performing detection processing on the result image, so as to obtain a second detection image with a plurality of second commodity frames, wherein each of the second commodity frames contains one piece of commodity;
   performing filtration processing on the second detection image based on the RGB difference image, so as to delete second commodity frames having an RGB difference smaller than a first preset value and corresponding commodities from the second detection image, hereby obtaining a second target detection image; and
   performing recognition processing on the second target detection image, so as to acquire second identification information in each of the second commodity frames in the target detection image.

4. The method for generating an order according to claim 1, wherein the method further comprises a step of:
   storing the result image and the second detection result, and setting the result image and the second detection result as an initial image and a first detection result for next pick-up operation.

5. The method for generating an order according to claim 1, wherein the acquiring an initial image and a first detection result of a target container before being subjected to a pick-up operation comprises:
   acquiring the initial image of the target container before being subjected to the pick-up operation;
   performing detection processing on the initial image, so as to obtain the first detection image with the plurality of first commodity frames, wherein each of the first commodity frames contains one piece of commodity; and
   performing recognition processing on the first detection image, so as to acquire the first identification information of the commodity in each of the first commodity frames in the first detection image.

6. A device for generating an order, comprising:
   one or more processors;
   a memory electrically coupled to the processors, wherein the memory stores non-volatile computer-readable instructions executed by the processors causing the device to:
      acquire an initial image and a first detection result of a target container before being subjected to a pick-up operation, wherein the first detection result comprises a first detection image with a plurality of first commodity frames obtained by processing the initial image, and first identification information corresponding to a commodity in each of the first commodity frames;
      acquire a result image of the target container after performing the pick-up operation;
      generate an RGB difference image between before-shopping and after-shopping based on the result image and the initial image, wherein the RGB difference image is obtained by calculating an absolute value of differences of individual pixels of the initial image and the result image before and after shopping in three RGB channels; and generate a commodity order corresponding to a removed commodity based on the RGB difference image and the first detection result, wherein generating a commodity order corresponding to a removed commodity based on the RGB difference image and the first detection result comprises:

screening out a first target commodity frame having an RGB difference smaller than a first preset value, from all of the first commodity frames in the first detection image, based on the RGB difference image, and acquiring first corresponding identification information; and generating the commodity order corresponding to the removed commodity based on the first target commodity frame and the first corresponding identification information;

wherein after acquiring a result image of the target container after performing the pick-up operation, the method further comprises performing detection processing on the result image, so as to obtain a second detection result, wherein the second detection result comprises a second detection image with a plurality of second commodity frames obtained by processing the result image and second identification information corresponding to a commodity in each of the second commodity frames, and generating a commodity order corresponding to a removed commodity based on the RGB difference image and the first detection result comprises generating the commodity order corresponding to the removed commodity based on the RGB difference image, the second detection result, and the first detection result.

7. An electronic apparatus, comprising:

a processor;

a memory electrically coupled to the processor wherein the memory stores computer readable instructions executed by the processor causing the processor to:

acquire an initial image and a first detection result of a target container before being subjected to a pick-up operation, wherein the first detection result comprises a first detection image with a plurality of first commodity frames obtained by processing the initial image, and first identification information corresponding to a commodity in each of the first commodity frames;

acquire a result image of the target container after performing the pick-up operation;

generate an RGB difference image between before-shopping and after-shopping, based on the result image and the initial image, wherein the RGB difference image is obtained by calculating an absolute value of differences of individual pixels of the initial image and the result image before and after shopping in three RGB channels; and generate a commodity order corresponding to a removed commodity based on the RGB difference image and the first detection result, wherein generating a commodity order corresponding to a removed commodity based on the RGB difference image and the first detection result comprises:

screening out a first target commodity frame having an RGB difference smaller than a first preset value, from all of the first commodity frames in the first detection image, based on the RGB difference image, and acquiring first corresponding identification information; and generating the commodity order corresponding to the removed commodity based on the first target commodity frame and the first corresponding identification information;

wherein after acquiring a result image of the target container after performing the pick-up operation, the method further comprises performing detection processing on the result image, so as to obtain a second detection result, wherein the second detection result comprises a second detection image with a plurality of second commodity frames obtained by processing the result image and second identification information corresponding to a commodity in each of the second commodity frames, and generating a commodity order corresponding to a removed commodity based on the RGB difference image and the first detection result comprises generating the commodity order corresponding to the removed commodity based on the RGB difference image, the second detection result, and the first detection result.

8. The electronic apparatus according to claim 7, wherein the generating a commodity order corresponding to a removed commodity based on the RGB difference image, the second detection result, and the first detection result comprises:

screening out a first target commodity frame having an RGB difference smaller than a first preset value, from all of the first commodity frames in the first detection image, based on the RGB difference image, and acquiring corresponding first identification information;

screening out a second target commodity frame having an RGB difference smaller than the first preset value, from all of the second commodity frames in the second detection image, based on the RGB difference image, and acquiring corresponding second identification information; and generating the commodity order corresponding to the removed commodity based on the first target commodity frame, the first identification information, the second target commodity frame, and the second identification information.

9. The electronic apparatus according to claim 7, wherein the detecting the result image so as to obtain a second detection result comprises:

performing detection processing on the result image, so as to obtain a second detection image with a plurality of second commodity frames, wherein each of the second commodity frames contains one piece of commodity;

performing filtration processing on the second detection image based on the RGB difference image, so as to delete second commodity frames having an RGB difference smaller than a first preset value and corresponding commodities from the second detection image, hereby obtaining a second target detection image; and performing recognition processing on the second target detection image, so as to acquire second identification information in each of the second commodity frames in the target detection image.

10. The electronic apparatus according to claim 7, wherein the method further comprises a step of:

storing the result image and the second detection result, and setting the result image and the second detection result as an initial image and a first detection result for next pick-up operation.

11. The electronic apparatus according to claim 7, wherein the acquiring an initial image and a first detection result of a target container before being subjected to a pick-up operation comprises:

acquiring the initial image of the target container before being subjected to the pick-up operation;

performing detection processing on the initial image, so as to obtain the first detection image with the plurality of first commodity frames, wherein each of the first commodity frames contains one piece of commodity; and performing recognition processing on the first detection image, so as to acquire the first identification information of the commodity in each of the first commodity frames in the first detection image.

\* \* \* \* \*